United States Patent
Tsuda et al.

(10) Patent No.: US 12,459,177 B2
(45) Date of Patent: *Nov. 4, 2025

(54) INJECTION-MOLDED BODY AND PRODUCTION METHOD THEREFOR

(71) Applicant: DAIKIN INDUSTRIES, LTD., Osaka (JP)

(72) Inventors: Hayato Tsuda, Osaka (JP); Tadaharu Isaka, Osaka (JP); Yumi Zenke, Osaka (JP); Yukari Yamamoto, Osaka (JP); Yasuyuki Yamaguchi, Osaka (JP); Hiroyuki Hamada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 68 days.

This patent is subject to a terminal disclaimer.

(21) Appl. No.: 18/453,810

(22) Filed: Aug. 22, 2023

(65) Prior Publication Data

US 2023/0390981 A1 Dec. 7, 2023

Related U.S. Application Data

(63) Continuation of application No. PCT/JP2022/003660, filed on Jan. 31, 2022.

(30) Foreign Application Priority Data

Feb. 26, 2021 (JP) .................................. 2021-031090
Feb. 26, 2021 (JP) .................................. 2021-031093

(Continued)

(51) Int. Cl.
*B29C 45/00* (2006.01)
*B29C 45/78* (2006.01)
(Continued)

(52) U.S. Cl.
CPC .......... *B29C 45/0001* (2013.01); *B29C 45/78* (2013.01); *B29K 2027/12* (2013.01); *B29K 2027/18* (2013.01)

(58) Field of Classification Search
CPC ..... B29C 45/1625; B29C 45/16; B29C 45/08; B29C 45/03; B29C 45/0062;
(Continued)

(56) References Cited

U.S. PATENT DOCUMENTS 3,635,926 A 1/1972 Gresham et al.
3,945,786 A 3/1976 Bishop
(Continued)

FOREIGN PATENT DOCUMENTS

CN 1599757 A 3/2005
CN 103946250 A 7/2014
(Continued)

OTHER PUBLICATIONS

European Search Report issued Dec. 4, 2024 for European Patent Application No. 22759287.0.
(Continued)

*Primary Examiner* — Stella K Yi
(74) *Attorney, Agent, or Firm* — Sughrue Mion, PLLC

(57) ABSTRACT

Provided an injection molded article obtained by injection molding a copolymer using a mold provided with a gate, wherein the copolymer contains tetrafluoroethylene (TFE) unit and a fluoro(alkyl vinyl ether) (PAVE) unit, the content of the fluoro(alkyl vinyl ether) unit of the copolymer is 3.5 to 4.7% by mass with respect to the whole of the monomer units, the melt flow rate at 372° C. of the copolymer is 22.0 to 35.0 g/10 min, the number of functional groups of the copolymer is 20 or less per $10^6$ main-chain carbon atoms, and the injection molded article has a gate section corresponding to the gate of the mold, and the ratio of the
(Continued)

maximum flow length from the gate section of the injection molded article (a) to the average value of the product thickness on the maximum flow length (b), ((a)/(b)), is 80 to 200.

9 Claims, 2 Drawing Sheets

(30) Foreign Application Priority Data

Feb. 26, 2021 (JP) ................................ 2021-031095
Feb. 26, 2021 (JP) ................................ 2021-031096
Sep. 30, 2021 (JP) ................................ 2021-162162

(51) Int. Cl.
  *B29K 27/12* (2006.01)
  *B29K 27/18* (2006.01)

(58) Field of Classification Search
  CPC .............. B29C 45/006; B29C 45/0046; B29C 45/0025; B29C 45/0001; B29C 2045/0094; B29C 2045/0049; B29C 2045/0037; B29C 2045/0029; B29C 2045/0027
  See application file for complete search history.

(56) References Cited

U.S. PATENT DOCUMENTS

| | | |
|---|---|---|
| 4,414,356 A | 11/1983 | Michel |
| 4,510,300 A | 4/1985 | Levy |
| 4,743,658 A | 5/1988 | Imbalzano et al. |
| 4,902,444 A | 2/1990 | Kolouch |
| 5,000,875 A | 3/1991 | Kolouch |
| 5,656,392 A | 8/1997 | Sano et al. |
| 5,767,198 A | 6/1998 | Shimizu et al. |
| 5,851,693 A | 12/1998 | Sano et al. |
| 6,069,215 A | 5/2000 | Araki et al. |
| 6,096,795 A | 8/2000 | Abusleme et al. |
| 6,689,833 B1 | 2/2004 | Bidstrup et al. |
| 6,713,183 B2 | 3/2004 | Araki et al. |
| 6,740,375 B1 | 5/2004 | Sagisaka et al. |
| 6,774,196 B1 | 8/2004 | Taira et al. |
| 11,826,975 B2 | 11/2023 | Imamura et al. |
| 2002/0011692 A1 | 1/2002 | Lahijani |
| 2002/0099143 A1 | 7/2002 | Namura |
| 2003/0013791 A1 | 1/2003 | Blong et al. |
| 2003/0109646 A1 | 6/2003 | Kubo et al. |
| 2003/0114615 A1 | 6/2003 | Sumi et al. |
| 2003/0190530 A1 | 10/2003 | Yang et al. |
| 2003/0216531 A1 | 11/2003 | Aten et al. |
| 2004/0072935 A1 | 4/2004 | Blong et al. |
| 2004/0102572 A1 | 5/2004 | Kubo et al. |
| 2004/0204536 A1 | 10/2004 | Miyatani et al. |
| 2004/0260044 A1 | 12/2004 | Earnest, Jr. et al. |
| 2005/0020792 A1 | 1/2005 | Aoyama et al. |
| 2007/0112155 A1 | 5/2007 | Takase et al. |
| 2007/0149734 A1 | 6/2007 | Sakakibara et al. |
| 2007/0281166 A1 | 12/2007 | Nishio |
| 2008/0038627 A1 | 2/2008 | Yamauchi et al. |
| 2008/0114143 A1 | 5/2008 | Brothers et al. |
| 2009/0038821 A1 | 2/2009 | Sato et al. |
| 2009/0044965 A1 | 2/2009 | Kono et al. |
| 2009/0176952 A1 | 7/2009 | Funaki et al. |
| 2009/0246435 A1 | 10/2009 | Shimono et al. |
| 2010/0063214 A1 | 3/2010 | Kasahara et al. |
| 2010/0212929 A1 | 8/2010 | Ishii et al. |
| 2010/0273047 A1 | 10/2010 | Kunoike et al. |
| 2010/0314153 A1 | 12/2010 | Ishii et al. |
| 2010/0314154 A1 | 12/2010 | Kitahara et al. |
| 2011/0052970 A1 | 3/2011 | Kurata et al. |
| 2011/0052977 A1 | 3/2011 | Kurata et al. |
| 2011/0104562 A1 | 5/2011 | Byun et al. |
| 2011/0203830 A1 | 8/2011 | Kono et al. |
| 2011/0272173 A1 | 11/2011 | Shiotsuki et al. |
| 2012/0035329 A1 | 2/2012 | Isogai et al. |
| 2012/0094169 A1 | 4/2012 | Kim et al. |
| 2013/0130100 A1 | 5/2013 | Kurata et al. |
| 2014/0227533 A1 | 8/2014 | Murakami et al. |
| 2014/0287177 A1 | 9/2014 | Suda et al. |
| 2014/0378616 A1 | 12/2014 | Nakano et al. |
| 2015/0041145 A1 | 2/2015 | Colaianna et al. |
| 2015/0148481 A1 | 5/2015 | Brothers et al. |
| 2015/0158988 A1 | 6/2015 | Sawaki et al. |
| 2016/0006004 A1 | 1/2016 | Ogawa et al. |
| 2016/0108159 A1 | 4/2016 | Sekiguchi et al. |
| 2016/0272805 A1 | 9/2016 | Nakanishi et al. |
| 2016/0319089 A1 | 11/2016 | Imamura et al. |
| 2017/0008986 A1 | 1/2017 | Isaka et al. |
| 2017/0025204 A1 | 1/2017 | Chapman et al. |
| 2017/0214037 A1 | 7/2017 | Uematsu et al. |
| 2017/0260344 A1 | 9/2017 | Imamura et al. |
| 2018/0009204 A1 | 1/2018 | Higuchi et al. |
| 2018/0036931 A1 | 2/2018 | Higuchi et al. |
| 2018/0237566 A1 | 8/2018 | Aida et al. |
| 2018/0265654 A1 | 9/2018 | Imamura et al. |
| 2018/0283590 A1 | 10/2018 | Yokoyama et al. |
| 2019/0134939 A1 | 5/2019 | Colaianna et al. |
| 2019/0143628 A1 | 5/2019 | Colaianna et al. |
| 2019/0177453 A1 | 6/2019 | Isaka et al. |
| 2019/0193315 A1 | 6/2019 | Miyamoto et al. |
| 2019/0375929 A1 | 12/2019 | Nishimura et al. |
| 2020/0332037 A1 | 10/2020 | Isaka et al. |
| 2021/0008827 A1 | 1/2021 | Colaianna et al. |
| 2021/0008828 A1 | 1/2021 | Colaianna et al. |
| 2021/0024769 A1 | 1/2021 | Imamura et al. |
| 2021/0189031 A1 | 6/2021 | Hintzer et al. |
| 2021/0269568 A1 | 9/2021 | Imamura et al. |
| 2022/0001657 A1 | 1/2022 | Kikuchi et al. |
| 2022/0033636 A1 | 2/2022 | Nishimura et al. |
| 2022/0170573 A1 | 6/2022 | Imamura et al. |
| 2022/0181689 A1 | 6/2022 | Isaka et al. |
| 2022/0181698 A1 | 6/2022 | Isaka et al. |
| 2022/0181729 A1 | 6/2022 | Isaka et al. |
| 2022/0195088 A1 | 6/2022 | Imamura et al. |
| 2022/0213996 A1 | 7/2022 | Imamura et al. |
| 2022/0266485 A1 | 8/2022 | Tsuda et al. |
| 2022/0278403 A1 | 9/2022 | Isaka et al. |
| 2023/0227594 A1 | 7/2023 | Yamamoto et al. |
| 2023/0235107 A1 | 7/2023 | Isaka et al. |
| 2023/0235159 A1 | 7/2023 | Isaka et al. |
| 2023/0235160 A1 | 7/2023 | Isaka et al. |
| 2023/0238627 A1 | 7/2023 | Isaka et al. |
| 2023/0238628 A1 | 7/2023 | Zenke et al. |
| 2023/0238629 A1 | 7/2023 | Isaka et al. |
| 2023/0272136 A1 | 8/2023 | Zenke et al. |
| 2023/0295356 A1 | 9/2023 | Isaka et al. |
| 2023/0383031 A1 | 11/2023 | Isaka et al. |
| 2023/0383032 A1 | 11/2023 | Isaka et al. |
| 2023/0383033 A1 | 11/2023 | Zenke et al. |
| 2023/0383034 A1 | 11/2023 | Isaka et al. |
| 2023/0390977 A1 | 12/2023 | Hamada et al. |
| 2023/0390978 A1 | 12/2023 | Tsuda et al. |
| 2023/0390979 A1 | 12/2023 | Tsuda et al. |
| 2023/0390980 A1 | 12/2023 | Tsuda et al. |
| 2023/0390981 A1 | 12/2023 | Tsuda et al. |
| 2023/0391909 A1 | 12/2023 | Isaka et al. |
| 2023/0391910 A1 | 12/2023 | Isaka et al. |
| 2023/0391911 A1 | 12/2023 | Isaka et al. |
| 2023/0391912 A1 | 12/2023 | Isaka et al. |
| 2023/0391917 A1 | 12/2023 | Isaka et al. |
| 2023/0391920 A1 | 12/2023 | Isaka et al. |
| 2023/0391927 A1 | 12/2023 | Isaka |
| 2023/0391929 A1 | 12/2023 | Isaka et al. |
| 2023/0391931 A1 | 12/2023 | Isaka et al. |
| 2023/0391932 A1 | 12/2023 | Isaka et al. |
| 2023/0391933 A1 | 12/2023 | Isaka et al. |
| 2023/0392737 A1 | 12/2023 | Tsuda et al. |
| 2023/0395282 A1 | 12/2023 | Isaka et al. |
| 2023/0399431 A1 | 12/2023 | Isaka et al. |
| 2023/0399432 A1 | 12/2023 | Isaka et al. |
| 2023/0399438 A1 | 12/2023 | Isaka et al. |

(56) References Cited

U.S. PATENT DOCUMENTS

| | | |
|---|---|---|
| 2023/0399441 A1 | 12/2023 | Isaka et al. |
| 2023/0399443 A1 | 12/2023 | Isaka et al. |
| 2023/0406975 A1 | 12/2023 | Isaka et al. |
| 2023/0406976 A1 | 12/2023 | Isaka et al. |
| 2023/0411751 A1 | 12/2023 | Tsuda et al. |
| 2023/0415387 A1 | 12/2023 | Hamada et al. |
| 2025/0002728 A1 | 1/2025 | Zenke et al. |
| 2025/0011488 A1 | 1/2025 | Isaka et al. |
| 2025/0011490 A1 | 1/2025 | Isaka et al. |
| 2025/0011494 A1 | 1/2025 | Isaka et al. |
| 2025/0011496 A1 | 1/2025 | Yamamoto et al. |
| 2025/0011498 A1 | 1/2025 | Isaka et al. |
| 2025/0011499 A1 | 1/2025 | Isaka et al. |
| 2025/0011500 A1 | 1/2025 | Isaka et al. |
| 2025/0019476 A1 | 1/2025 | Isaka et al. |
| 2025/0034302 A1 | 1/2025 | Isaka et al. |

FOREIGN PATENT DOCUMENTS

| | | |
|---|---|---|
| CN | 107428144 A | 12/2017 |
| CN | 109476061 A | 3/2019 |
| CN | 110712348 A | 1/2020 |
| CN | 110790854 A | 2/2020 |
| CN | 114223086 A | 3/2022 |
| CN | 114258609 A | 3/2022 |
| CN | 116390957 A | 7/2023 |
| CN | 116867821 A | 10/2023 |
| CN | 116917346 A | 10/2023 |
| EP | 0 220 910 A2 | 5/1987 |
| EP | 0 423 995 A1 | 4/1991 |
| EP | 0 976 544 A1 | 2/2000 |
| EP | 1 462 458 A1 | 9/2004 |
| EP | 4 024 550 A1 | 7/2022 |
| EP | 4 024 575 A1 | 7/2022 |
| EP | 4 223 793 A1 | 8/2023 |
| EP | 4 223 794 A1 | 8/2023 |
| GB | 1210794 A | 10/1970 |
| JP | 48-20788 B1 | 6/1973 |
| JP | 58-132512 A | 8/1983 |
| JP | 58-191127 A | 11/1983 |
| JP | 59-120433 A | 7/1984 |
| JP | 62-104822 A | 5/1987 |
| JP | 62-53019 B2 | 11/1987 |
| JP | 1-53167 B2 | 11/1989 |
| JP | 2-129253 A | 5/1990 |
| JP | 3-184209 A | 8/1991 |
| JP | 3-247609 A | 11/1991 |
| JP | 4-357398 A | 12/1992 |
| JP | 6-1902 A | 1/1994 |
| JP | 6-40813 B2 | 6/1994 |
| JP | 6-287405 A | 10/1994 |
| JP | 7-16869 A | 1/1995 |
| JP | 7-112449 A | 5/1995 |
| JP | 7-188337 A | 7/1995 |
| JP | 7-290496 A | 11/1995 |
| JP | 8-207106 A | 8/1996 |
| JP | 8-321287 A | 12/1996 |
| JP | 9-245832 A | 9/1997 |
| JP | 10-87746 A | 4/1998 |
| JP | 10-275604 A | 10/1998 |
| JP | 10-292054 A | 11/1998 |
| JP | 2001-151825 A | 6/2001 |
| JP | 2001-151826 A | 6/2001 |
| JP | 2001-283907 A | 10/2001 |
| JP | 2001-283921 A | 10/2001 |
| JP | 2002-53620 A | 2/2002 |
| JP | 2002-63934 A | 2/2002 |
| JP | 2002-167488 A | 6/2002 |
| JP | 2003-327770 A | 11/2003 |
| JP | 2003-534940 A | 11/2003 |
| JP | 2004-256406 A | 9/2004 |
| JP | 2004-534131 A | 11/2004 |
| JP | 2005-523979 A | 8/2005 |
| JP | 2005-298659 A | 10/2005 |
| JP | 2005-320497 A | 11/2005 |
| JP | 2006-117912 A | 5/2006 |
| JP | 2006-312736 A | 11/2006 |
| JP | 2007-238960 A | 9/2007 |
| JP | 2008-66254 A | 3/2008 |
| JP | 2009-42478 A | 2/2009 |
| JP | 2009-59690 A | 3/2009 |
| JP | 2009-235564 A | 10/2009 |
| JP | 2009-272207 A | 11/2009 |
| JP | 2010-56079 A | 3/2010 |
| JP | 2010-509443 A | 3/2010 |
| JP | 2010-85741 A | 4/2010 |
| JP | 2010-162817 A | 7/2010 |
| JP | 2010-235667 A | 10/2010 |
| JP | 2011-48976 A | 3/2011 |
| JP | 2011-71104 A | 4/2011 |
| JP | 2012-54269 A | 3/2012 |
| JP | 2012-80911 A | 4/2012 |
| JP | 2012-106494 A | 6/2012 |
| JP | 2012-130557 A | 7/2012 |
| JP | 2013-71341 A | 4/2013 |
| JP | 2013-82888 A | 5/2013 |
| JP | 2013-177574 A | 9/2013 |
| JP | 2014-28951 A | 2/2014 |
| JP | 2014-59052 A | 4/2014 |
| JP | 2014-187040 A | 10/2014 |
| JP | 2015-7218 A | 1/2015 |
| JP | 2015-519410 A | 7/2015 |
| JP | 2015-147924 A | 8/2015 |
| JP | 2015-168840 A | 9/2015 |
| JP | 2016-537499 A | 12/2016 |
| JP | 2017-197690 A | 11/2017 |
| JP | 2018-20468 A | 2/2018 |
| JP | 2018-51 4598 A | 6/2018 |
| JP | 2018-523272 A | 8/2018 |
| JP | 2018-159090 A | 10/2018 |
| JP | 2019-172962 A | 10/2019 |
| JP | 2019-210420 A | 12/2019 |
| JP | 2019-214641 A | 12/2019 |
| JP | 2020-2341 A | 1/2020 |
| JP | 2020-15906 A | 1/2020 |
| JP | 2020-29042 A | 2/2020 |
| JP | 2020-100823 A | 7/2020 |
| JP | 2020-100843 A | 7/2020 |
| JP | 2021-6648 A | 1/2021 |
| JP | 2021-141043 A | 9/2021 |
| JP | 2021-141045 A | 9/2021 |
| JP | 2022-19196 A | 1/2022 |
| KR | 10-2004-0071160 A | 8/2004 |
| KR | 10-2019-0034205 A | 4/2019 |
| WO | 95/29956 A1 | 11/1995 |
| WO | 01/40331 A1 | 6/2001 |
| WO | 03/006566 A1 | 1/2003 |
| WO | 03/048214 A1 | 6/2003 |
| WO | 2004/052987 A1 | 6/2004 |
| WO | 2008/032613 A1 | 3/2008 |
| WO | 2008/047759 A1 | 4/2008 |
| WO | 2008/047906 A1 | 4/2008 |
| WO | 2008/143069 A1 | 11/2008 |
| WO | 2010/113864 A1 | 10/2010 |
| WO | 2013/115374 A1 | 8/2013 |
| WO | 2014/007346 A1 | 1/2014 |
| WO | 2014/129413 A1 | 8/2014 |
| WO | 2015/119053 A1 | 8/2015 |
| WO | 2016/117492 A1 | 7/2016 |
| WO | 2017/056203 A1 | 4/2017 |
| WO | 2017/082417 A1 | 5/2017 |
| WO | 2019/003265 A1 | 1/2019 |
| WO | 2020/004083 A1 | 1/2020 |
| WO | 2020/090981 A1 | 5/2020 |
| WO | 2020/204163 A1 | 10/2020 |
| WO | 2021/033539 A1 | 2/2021 |
| WO | 2021/039862 A1 | 3/2021 |
| WO | 2021/039863 A1 | 3/2021 |
| WO | 2021/039865 A1 | 3/2021 |
| WO | 2021039864 A1 | 3/2021 |

(56) References Cited

FOREIGN PATENT DOCUMENTS

| WO | 2021/059753 A1 | 4/2021 |
| WO | 2022/181225 A1 | 1/2022 |

OTHER PUBLICATIONS

European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al, "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).
Translation of the International Search Report issued Oct. 13, 2020 in International Application No. PCT/JP2020/032236.
Translation of the International Search Report issued Oct. 13, 2020 in International Application No. PCT/JP2020/032237.
Translation of the International Search Report issued Oct. 13, 2020 in International Application No. PCT/JP2020/032238.
Translation of the International Search Report issued Oct. 13, 2020 in International Application No. PCT/JP2020/032239.
Translation of the International Search Report issued Oct. 6, 2020 in International Application No. PCT/JP2020/032234.
International Preliminary Report on Patentability, with Translation of Written Opinion issued Mar. 1, 2022 in International Application No. PCT/JP2020/032238.
International Preliminary Report on Patentability, with Translation of Written Opinion issued Mar. 1, 2022 in International Application No. PCT/JP2020/032239.
International Preliminary Report on Patentability, with Translation of Written Opinion issued Mar. 1, 2022 in International Application No. PCT/JP2020/032236.
International Preliminary Report on Patentability, with Translation of Written Opinion issued Mar. 1, 2022 in International Application No. PCT/JP2020/032237.
International Preliminary Report on Patentability, with Translation of Written Opinion issued Mar. 1, 2022 in International Application No. PCT/JP2020/032234.
Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.
Translation of the International Search Report dated Nov. 1, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.

(56) References Cited

OTHER PUBLICATIONS

Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
European Search Report issued Aug. 2, 2023 for European Patent Application No. 20 857 704.9.
International Preliminary Report on Patentability, with Translation of Written Opinion issued Aug. 29, 2023 in International Application No. PCT/JP2022/003634.
International Preliminary Report on Patentability, with Translation of Written Opinion issued Aug. 29, 2023 in International Application No. PCT/JP2022/003635.
International Preliminary Report on Patentability, with Translation of Written Opinion issued Aug. 29, 2023 in International Application No. PCT/JP2022/003636.
International Preliminary Report on Patentability, with Translation of Written Opinion issued Aug. 29, 2023 in International Application No. PCT/JP2022/003637.
International Preliminary Report on Patentability, with Translation of Written Opinion issued Aug. 29, 2023 in International Application No. PCT/JP2022/003638.
International Preliminary Report on Patentability, with Translation of Written Opinion issued Aug. 29, 2023 in International Application No. PCT/JP2022/003640.
International Preliminary Report on Patentability, with Translation of Written Opinion issued Aug. 29, 2023 in International Application No. PCT/JP2022/003641.
International Preliminary Report on Patentability, with Translation of Written Opinion issued Aug. 29, 2023 in International Application No. PCT/JP2022/003642.
International Preliminary Report on Patentability, with Translation of Written Opinion issued Aug. 29, 2023 in International Application No. PCT/JP2022/003643.
International Preliminary Report on Patentability, with Translation of Written Opinion issued Aug. 29, 2023 in International Application No. PCT/JP2022/003644.
International Preliminary Report on Patentability, with Translation of Written Opinion issued Aug. 29, 2023 in International Application No. PCT/JP2022/003645.
International Preliminary Report on Patentability, with Translation of Written Opinion issued Aug. 29, 2023 in International Application No. PCT/JP2022/003646.
International Preliminary Report on Patentability, with Translation of Written Opinion issued Aug. 29, 2023 in International Application No. PCT/JP2022/003647.
International Preliminary Report on Patentability, with Translation of Written Opinion issued Aug. 29, 2023 in International Application No. PCT/JP2022/003648.
International Preliminary Report on Patentability, with Translation of Written Opinion issued Aug. 29, 2023 in International Application No. PCT/JP2022/003649.
International Preliminary Report on Patentability, with Translation of Written Opinion issued Aug. 29, 2023 in International Application No. PCT/JP2022/003650.
International Preliminary Report on Patentability, with Translation of Written Opinion issued Aug. 29, 2023 in International Application No. PCT/JP2022/003651.
International Preliminary Report on Patentability, with Translation of Written Opinion issued Aug. 29, 2023 in International Application No. PCT/JP2022/003652.
International Preliminary Report on Patentability, with Translation of Written Opinion issued Aug. 29, 2023 in International Application No. PCT/JP2022/003653.
International Preliminary Report on Patentability, with Translation of Written Opinion issued Aug. 29, 2023 in International Application No. PCT/JP2022/003654.
International Preliminary Report on Patentability, with Translation of Written Opinion issued Aug. 29, 2023 in International Application No. PCT/JP2022/003657.
International Preliminary Report on Patentability, with Translation of Written Opinion issued Aug. 29, 2023 in International Application No. PCT/JP2022/003658.
International Preliminary Report on Patentability, with Translation of Written Opinion issued Aug. 29, 2023 in International Application No. PCT/JP2022/003659.
International Preliminary Report on Patentability, with Translation of Written Opinion issued Aug. 29, 2023 in International Application No. PCT/JP2022/003660.
International Preliminary Report on Patentability, with Translation of Written Opinion issued Aug. 29, 2023 in International Application No. PCT/JP2022/003661.
International Preliminary Report on Patentability, with Translation of Written Opinion issued Aug. 29, 2023 in International Application No. PCT/JP2022/003664.
International Preliminary Report on Patentability, with Translation of Written Opinion issued Aug. 29, 2023 in International Application No. PCT/JP2022/003665.
International Preliminary Report on Patentability, with Translation of Written Opinion issued Aug. 29, 2023 in International Application No. PCT/JP2022/007735.
International Preliminary Report on Patentability, with Translation of Written Opinion issued Aug. 29, 2023 in International Application No. PCT/JP2022/007737.
International Preliminary Report on Patentability, with Translation of Written Opinion issued Aug. 29, 2023 in International Application No. PCT/JP2022/007738.
Translation of the International Search Report dated Jun. 20, 2023 in International Application No. PCT/JP2023/013284.
Translation of the International Search Report dated Jun. 6, 2023 in International Application No. PCT/JP2023/013285.

(56) References Cited

OTHER PUBLICATIONS

Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
U.S. Appl. No. 17/679,789, filed Feb. 24, 2022, Isaka, et al., cont of PCT/JP2020/032238.
U.S. Appl. No. 17/679,831, filed Feb. 24, 2022, Isaka, et al., cont of PCT/JP2020/032239.
U.S. Appl. No. 17/679,818, filed Feb. 24, 2022, Isaka, et al., cont of PCT/JP2020/032236.
U.S. Appl. No. 17/679,765, filed Feb. 24, 2022, Isaka, et al., cont of PCT/JP2020/032237.
U.S. Appl. No. 17/680,911, filed Feb. 25, 2022, Tsuda, et al., cont of PCT/JP2020/032234.
U.S. Appl. No. 18/191,412, filed Mar. 28, 2023, Isaka, et al., cont of PCT/JP2021/036301.
U.S. Appl. No. 18/191,461, filed Mar. 28, 2023, Zenke, et al., cont of PCT/JP2021/036302.
U.S. Appl. No. 18/192,020, filed Mar. 29, 2023, Isaka, et al., cont of PCT/JP2021/036303.
U.S. Appl. No. 18/192,053, filed Mar. 29, 2023, Isaka, et al., cont of PCT/JP2021/036304.
U.S. Appl. No. 18/192,101, filed Mar. 29, 2023, Yamamoto, et al., cont of PCT/JP2021/036305.
U.S. Appl. No. 18/191,996, filed Mar. 29, 2023, Tsuda, et al., cont of PCT/JP2021/036306.
U.S. Appl. No. 18/192,052, filed Mar. 29, 2023, Zenke, et al., cont of PCT/JP2021/036307.
U.S. Appl. No. 18/192,011, filed Mar. 29, 2023, Isaka, et al., cont of PCT/JP2021/036308.
U.S. Appl. No. 18/192,077, filed Mar. 29, 2023, Isaka, et al., cont of PCT/JP2021/036309.
U.S. Appl. No. 18/192,298, filed Mar. 29, 2023, Isaka, et al., cont of PCT/JP2021/036310.
U.S. Appl. No. 18/453,775, filed Aug. 22, 2023, Tsuda, et al., cont of PCT/JP2022/007735.
U.S. Appl. No. 18/453,690, filed Aug. 22, 2023, Tsuda, et al., cont of PCT/JP2022/007737.
U.S. Appl. No. 18/452,806, filed Aug. 21, 2023, Tsuda, et al., cont of PCT/JP2022/007738.
U.S. Appl. No. 18/450,642, filed Aug. 16, 2023, Isaka, et al., cont of PCT/JP2022/003634.
U.S. Appl. No. 18/448,291, filed Aug. 11, 2023, Isaka, et al., cont of PCT/JP2022/003635.
U.S. Appl. No. 18/449,061, filed Aug. 14, 2023, Isaka, et al., cont of PCT/JP2022/003636.
U.S. Appl. No. 18/448,234, filed Aug. 11, 2023, Isaka, et al., cont of PCT/JP2022/003637.
U.S. Appl. No. 18/453,363, filed Aug. 22, 2023, Isaka, et al., cont of PCT/JP2022/003638.

(56) References Cited

OTHER PUBLICATIONS

U.S. Appl. No. 18/449,788, filed Aug. 15, 2023, Isaka, et al., cont of PCT/JP2022/003640.
U.S. Appl. No. 18/451,502, filed Aug. 17, 2023, Isaka, et al., cont of PCT/JP2022/003641.
U.S. Appl. No. 18/450,590, filed Aug. 16, 2023, Tsuda, et al., cont of PCT/JP2022/003642.
U.S. Appl. No. 18/450,094, filed Aug. 15, 2023, Hamada, et al., cont of PCT/JP2022/003643.
U.S. Appl. No. 18/449,845, filed Aug. 15, 2023, Zenke, et al., cont of PCT/JP2022/003644.
U.S. Appl. No. 18/446,746, filed Aug. 9, 2023, Isaka, et al., cont of PCT/JP2022/003645.
U.S. Appl. No. 18/450,491, filed Aug. 16, 2023, Isaka, et al., cont of PCT/JP2022/003646.
U.S. Appl. No. 18/451,525, filed Aug. 17, 2023, Isaka, et al., cont of PCT/JP2022/003647.
U.S. Appl. No. 18/451,455, filed Aug. 17, 2023, Isaka, et al., cont of PCT/JP2022/003468.
U.S. Appl. No. 18/452,107, filed Aug. 18, 2023, Isaka, et al., cont of PCT/JP2022/003649.
U.S. Appl. No. 18/452,146, filed Aug. 18, 2023, Isaka, et al., cont of PCT/JP2022/003650.
U.S. Appl. No. 18/448,341, filed Aug. 11, 2023, Isaka, et al., cont of PCT/JP2022/003651.
U.S. Appl. No. 18/449,778, filed Aug. 15, 2023, Isaka, et al., cont of PCT/JP2022/003652.
U.S. Appl. No. 18/447,877, filed Aug. 10, 2023, Isaka, et al., cont of PCT/JP2022/003653.
U.S. Appl. No. 18/452,908, filed Aug. 21, 2023, Isaka, et al., cont of PCT/JP2022/003654.
U.S. Appl. No. 18/454,141, filed Aug. 23, 2023, Isaka, et al., cont of PCT/JP2022/003657.
U.S. Appl. No. 18/453,709, filed Aug. 22, 2023, Isaka, et al., cont of PCT/JP2022/003658.
U.S. Appl. No. 18/452,769, filed Aug. 21, 2023, Isaka, et al., cont of PCT/JP2022/003659.
U.S. Appl. No. 18/453,810, filed Aug. 22, 2023, Tsuda, et al., cont of PCT/JP2022/003660.
U.S. Appl. No. 18/450,568, filed Aug. 16, 2023, Hamada, et al., cont of PCT/JP2022/003661.
U.S. Appl. No. 18/453,683, filed Aug. 22, 2023, Isaka, et al., cont of PCT/JP2022/003664.
U.S. Appl. No. 18/454,133, filed Aug. 23, 2023, Isaka, et al., cont of PCT/JP2022/003665.
European Search Report issued Feb. 10, 2025 for European Patent Application No. 22759283.9.
European Search Report issued Feb. 20, 2025 for European Patent Application No. 22759263.1.

INJECTION-MOLDED BODY AND PRODUCTION METHOD THEREFOR

CROSS-REFERENCE TO RELATED APPLICATIONS

This application is a Rule 53(b) Continuation of International Application No. PCT/JP2022/003660 filed Jan. 31, 2022, which claims priorities based on Japanese Patent Application No. 2021-031090 filed Feb. 26, 2021, Japanese Patent Application No. 2021-031093 filed Feb. 26, 2021, Japanese Patent Application No. 2021-031095 filed Feb. 26, 2021, Japanese Patent Application No. 2021-031096 filed Feb. 26, 2021, and Japanese Patent Application No. 2021-162162 filed Sep. 30, 2021, the respective disclosures of which are incorporated herein by reference in their entirety.

TECHNICAL FIELD

The present disclosure relates to an injection molded article and a method for producing the same.

BACKGROUND ART

Patent Document 1 describes an ozone-resistant injection molded article comprising a perfluororesin, wherein the perfluororesin is composed of a perfluoro polymer, has an MIT value of 300,000 cycles or more, and has not more than 50 unstable end groups per $1 \times 10^6$ carbon atoms in the perfluoro polymer.

RELATED ART

Patent Documents

Patent Document 1: International Publication No. WO 2003/048214

SUMMARY

According to the present disclosure, there is provided an injection molded article obtained by injection molding a copolymer using a mold provided with a gate, wherein the copolymer contains tetrafluoroethylene (TFE) unit and a fluoro(alkyl vinyl ether) (PAVE) unit, the content of the fluoro(alkyl vinyl ether) unit of the copolymer is 3.5 to 4.7% by mass with respect to the whole of the monomer units, the melt flow rate at 372° C. of the copolymer is 22.0 to 35.0 g/10 min, the number of functional groups of the copolymer is 20 or less per $10^6$ main-chain carbon atoms, and the injection molded article has a gate section corresponding to the gate of the mold, and the ratio of a maximum flow length (a) from the gate section of the injection molded article to an average value (b) of a product thickness on the maximum flow length, ((a)/(b)), is 80 to 200.

Effects

According to the present disclosure, there can be provided an injection molded article which is excellent in the abrasion resistance at 90° C., the long-time tensile creep property, the chemical solution low permeability, the rigidity on heating and the heat distortion resistance after chemical immersion, hardly makes fluorine ions dissolve out in a chemical solution, and has a beautiful appearance and a high flow length.

DESCRIPTION OF EMBODIMENTS

Figure 1:
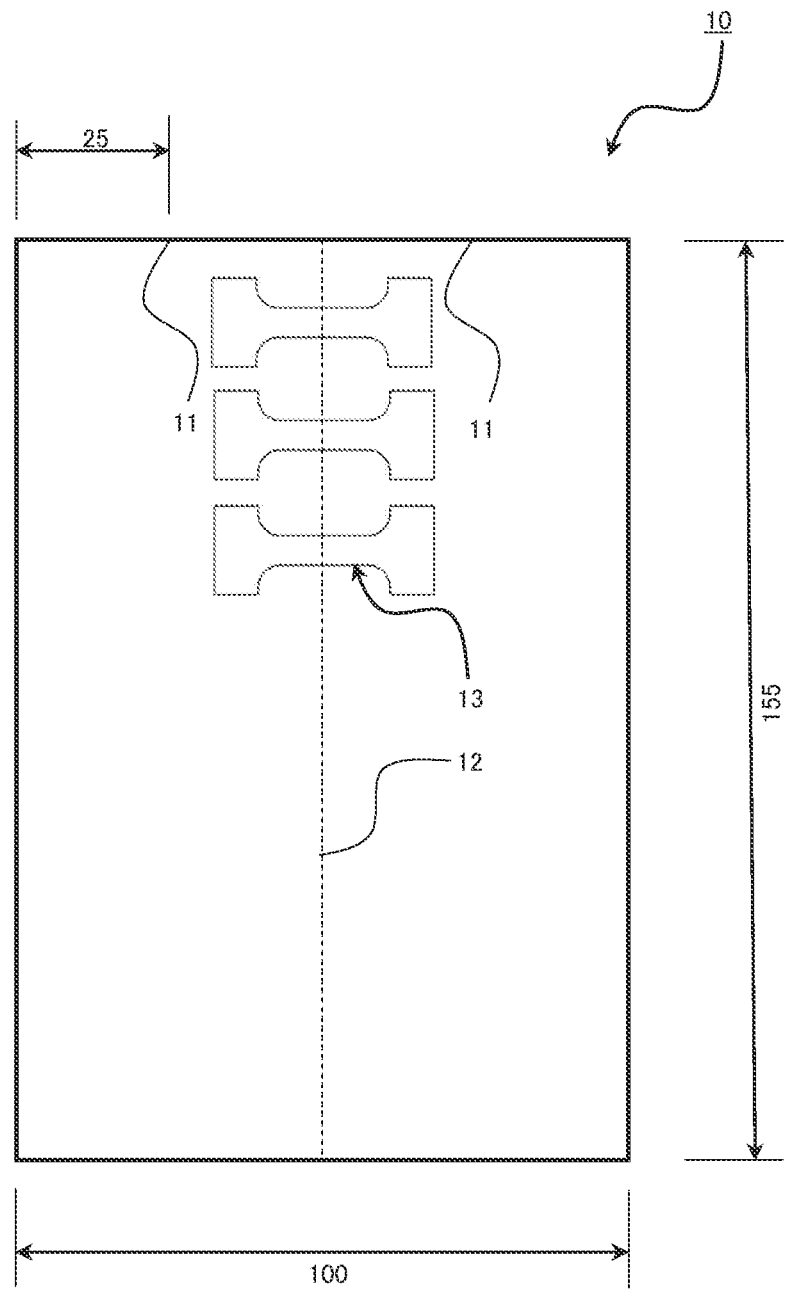
FIG. 1 is a diagram of a production method of a micro dumbbell shape test piece.

Hereinafter, specific embodiments of the present disclosure will be described in detail, but the present disclosure is not limited to the following embodiments.

Patent Document 1 proposes, in particular, as an article excellent in the ozone resistance such as a piping member or a joint used in a semiconductor production apparatus, an ozone-resistant injection molded article comprising a perfluororesin, wherein the perfluororesin is composed of a perfluoro polymer, has an MIT value of 300,000 cycles or more, and has not more than 50 unstable end groups per $1 \times 10^6$ carbon atoms in the perfluoro polymer. It is also described in Examples of Patent Document 1 that a cap nut of 43 mm in minimum outer diameter, 27.02 mm in internal diameter, and 30 mm in height is produced by injection molding using an injection molding machine.

However, it is difficult to use the ozone-resistant injection molded article described in Patent Document 1 as an injection molded article having a beautiful appearance and a high flow length. For example, piping members that are used to transfer a chemical solution, such as joints, and flowmeter members for measuring the flow rate of a chemical solution often have a complicated shape, and they are required to have a beautiful appearance. When a chemical solution at a high pressure or a chemical solution at a high temperature is allowed to flow, the chemical solution at a high pressure or the chemical solution at a high temperature passes through the piping member or the flowmeter member. Since the pressure of the chemical solution frequently varies, for example, at the start of the supply of fluid, at the stop of the supply of fluid, at the change of the supply pressure of fluid, not only the durability against a chemical solution at a high pressure and a high temperature, but also the durability against the variation of pressure is also required. Therefore, there is required an injection molded article which is excellent in the abrasion resistance at high temperatures, the long-time tensile creep property, the chemical solution low permeability, the rigidity on heating and the heat distortion resistance after chemical immersion, and has a beautiful appearance and a high flow length.

The injection molded article of the present disclosure is an injection molded article obtained by injection molding a specific copolymer using a mold provided with a gate, the injection molded article has a gate section corresponding to the gate of the mold, and the ratio of the maximum flow length (a) from the gate section of the injection molded article to the average value (b) of the product thickness on the maximum flow length, ((a)/(b)), is 80 to 200. The injection molded article of the present disclosure, due to having such a configuration, is excellent in the abrasion resistance at 90° C., the long-time tensile creep property, the chemical solution low permeability, the rigidity on heating and the heat distortion resistance after chemical immersion, hardly makes fluorine ions dissolve out in a chemical solution, and has a beautiful appearance and a high flow length.

The injection molded article of the present disclosure has a gate section. The gate section corresponds to the gate provided in the mold used in injection molding, and is usually observed on the surface of an injection molded article as a gate mark that remains on the injection molded article after the gate and the injection molded article are separated from each other. The number of the gate section is not limited, and is preferably 1 or more, may be 4 or less, and is more preferably 1.

The injection molded article of the present disclosure has a high flow length, and the ratio of the maximum flow length (a) from the gate section of the injection molded article to the average value (b) of the product thickness on the maximum flow length, ((a)/(b)), is 80 to 200. The ratio ((a)/(b)) is preferably 85 or more, more preferably 87 or more, still more preferably 90 or more, especially preferably 94 or more, and most preferably 100 or more, and preferably 150 or less, and more preferably 135 or less. In an injection molded article having a high ratio ((a)/(b)), forming defects such as scratches and surface delamination are likely to remain, and the smoothness is likely to deteriorate. On the other hand, it is difficult to utilize conventional injection molded articles having a low flow length as injection molded articles that are likely to have a long flow length, such as piping members that are used to transfer a chemical solution, such as joints, and flowmeter members for measuring the flow rate of a chemical solution, even when the conventional injection molded articles are excellent in the rigidity on heating and the heat distortion resistance after chemical immersion. The injection molded article of the present disclosure is excellent in the abrasion resistance at 90° C., the long-time tensile creep property, the chemical solution low permeability, the rigidity on heating and the heat distortion resistance after chemical immersion, and furthermore, has a high flow length.

The maximum flow length (a) from the gate section refers to the distance the copolymer has flowed in a mold, and can be specified by, for example, measuring the distance between the gate section and the weld section generated at the portion where the copolymer flowed in the mold joins. Alternatively, when no weld section is present between the gate section and the edge of the injection molded article which is located farthest from the gate section, the maximum flow length from the gate section (a) can be specified by measuring the distance between the gate section and the edge of the injection molded article which is located farthest from the gate section. When a plurality of distances the copolymer has flowed in a mold can be specified, for example, when an injection molded article has a plurality of gate sections, the longest distance among the specified distances is determined as the maximum flow length (a) from the gate section.

The ratio ((a)/(b)) can be determined by dividing the maximum flow length (a) determined as above by the average value (b) of the product thickness on the maximum flow length. The average value (b) of the product thickness on the maximum flow length can be calculated by measuring the minimum diameter of a cross section orthogonal to a line drawn to measure the maximum flow length (a) (the product thickness on the maximum flow length, when the cross section is a quadrangle, the short side) for every 2 mm along the line drawn to measure the maximum flow length, integrating the measured values, and calculating the average of the measured values.

The injection molded article of the present disclosure usually has a weld section corresponding to a portion where a resin has flowed in a mold and joined. The weld section can usually be observed as a weld line on the surface of the injection molded article. In the present disclosure, in addition to a large weld line that can be said as a forming defect, a hardly visible weld line is also included in the weld section.

The injection molded article of the present disclosure has a beautiful appearance and has a small maximum depth of the weld section. Thus, in the injection molded article of the present disclosure, the ratio of the maximum depth (D) of the weld section to the maximum thickness (L) of the injection molded article, (D/L), is preferably 0.8 or lower, more preferably 0.7 or lower, still more preferably 0.5 or lower, further still more preferably 0.3 or lower, and especially preferably 0.2 or lower. It can be said that as the maximum depth of the weld section is smaller, the surface of the injection molded article is smoother, and the injection molded article is more excellent in the transparency. It has also been found that as the ratio of the maximum depth (D) of the weld section to the maximum thickness (L) of the injection molded article, (D/L), is smaller, the tensile strength of the injection molded article increases significantly.

The injection molded article of the present disclosure contains a copolymer containing tetrafluoroethylene (TFE) unit and a fluoro(alkyl vinyl ether) (FAVE) unit. The copolymer is a melt-fabricable fluororesin. Being melt-fabricable means that a polymer can be melted and processed by using a conventional processing device such as an extruder or an injection molding machine.

Examples of the FAVE constituting the above FAVE unit include at least one selected from the group consisting of a monomer represented by the general formula (1):

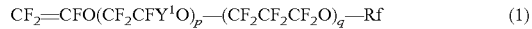

$$CF_2=CFO(CF_2CFY^1O)_p-(CF_2CF_2CF_2O)_q-Rf \qquad (1)$$

wherein $Y^1$ represents F or $CF_3$, and Rf represents a perfluoroalkyl group having 1 to 5 carbon atoms; p represents an integer of 0 to 5; and q represents an integer of 0 to 5, and a monomer represented by the general formula (2):

$$CFX=CXOCF_2OR^1 \qquad (2)$$

wherein X is the same or different and represents H, F or $CF_3$; $R^1$ represents a linear or branched fluoroalkyl group having 1 to 6 carbon atoms which may contain one or two atoms of at least one type selected from the group consisting of H, Cl, Br and I, or a cyclic fluoroalkyl group having 5 or 6 carbon atoms which may contain one or two atoms of at least one type selected from the group consisting of H, Cl, Br and I.

Among them, the above FAVE is preferably the monomer represented by the general formula (1), more preferably at least one selected from the group consisting of perfluoro (methyl vinyl ether), perfluoro(ethyl vinyl ether) (PEVE) and perfluoro(propyl vinyl ether) (PPVE), still more preferably at least one selected from the group consisting of PEVE and PPVE, and particularly preferably PPVE.

The content of the FAVE unit of the copolymer is 3.5 to 4.7% by mass with respect to the whole of the monomer units. The content of the FAVE unit of the copolymer is preferably 3.6% by mass or higher, more preferably 3.7% by mass or higher, still more preferably 3.8% by mass or higher, and especially preferably 3.9% by mass or higher, and preferably 4.6% by mass or lower, and more preferably 4.5% by mass or lower. When the content of the FAVE unit of the copolymer is too high, the rigidity on heating, the long-time tensile creep property and the chemical solution low permeability of the injection molded article deteriorate. When the content of the FAVE unit of the copolymer is too low, the abrasion resistance at 90° C. and the heat distortion resistance after chemical immersion of the injection molded article deteriorate.

The content of the TFE unit of the copolymer is, with respect to the whole of the monomer units, preferably 95.3 to 96.5% by mass, more preferably 95.4% by mass or higher, and still more preferably 95.5% by mass or higher, and more preferably 96.4% by mass or lower, still more preferably 96.3% by mass or lower, further still more preferably 96.2% by mass or lower, and especially preferably 96.1% by mass or lower. When the content of the TFE unit of the copolymer is too low, the rigidity on heating, the long-time tensile creep property and the chemical solution low permeability of the injection molded article may deteriorate. When the content of the TFE unit of the copolymer is too high, the abrasion resistance at 90° C. and the heat distortion resistance after chemical immersion of the injection molded article may deteriorate.

In the present disclosure, the content of each monomer unit in the copolymer is measured by a 19F-NMR method.

The copolymer can also contain a monomer unit originated from a monomer copolymerizable with TFE and FAVE. In this case, the content of the monomer unit copolymerizable with TFE and FAVE is, with respect to the whole of the monomer units of the copolymer, preferably 0 to 1.2% by mass, more preferably 0.05 to 0.5% by mass, and still more preferably 0.1 to 0.3% by mass.

The monomers copolymerizable with TFE and FAVE may include hexafluoropropylene (HFP), vinyl monomers represented by $CZ^1Z^2=CZ^3(CF_2)_nZ^4$ wherein $Z^1$, $Z^2$ and $Z^3$ are identical or different, and represent H or F; $Z^4$ represents H, F or Cl; and n represents an integer of 2 to 10, and alkyl perfluorovinyl ether derivatives represented by $CF_2=CF-OCH_2-Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the FAVE unit, and TFE/HFP/FAVE copolymer, and is more preferably a copolymer consisting only of the TFE unit and the FAVE unit.

The melt flow rate (MFR) of the copolymer is 22.0 to 35.0 g/10 min. The MFR of the copolymer is preferably 23.0 g/10 min or higher, and more preferably 24.0 g/10 min or higher, and preferably 33.0 g/10 min or lower, more preferably 32.0 g/10 min or lower, still more preferably 31.0 g/10 min or lower, and especially preferably 30.0 g/10 min or lower. When the MFR of the copolymer is too low, not only the chemical solution low permeability and the appearance of the injection molded article deteriorate, but also an injection molded article having a flow length may not be obtained. When the MFR of the copolymer is too high, the abrasion resistance at 90° C. and the heat distortion resistance after chemical immersion of the injection molded article deteriorate.

In the present disclosure, the MFR is a value obtained as a mass (g/10 min) of the polymer flowing out from a nozzle of 2.1 mm in inner diameter and 8 mm in length per 10 min at 372° C. under a load of 5 kg using a melt indexer, according to ASTM D1238.

The MFR can be regulated by regulating the kind and amount of a polymerization initiator to be used in polymerization of monomers, the kind and amount of a chain transfer agent, and the like.

In the present disclosure, the number of functional groups per $10^6$ main-chain carbon atoms of the copolymer is 20 or less, preferably 15 or less, more preferably 10 or less, and still more preferably less than 6. Due to that the number of functional groups of the copolymer is within the above range, the chemical solution low permeability of the injection molded article can be improved, and the amount of fluorine ions dissolving out from the injection molded article in a chemical solution can be significantly reduced.

For identification of the kind of the functional groups and measurement of the number of the functional groups, infrared spectroscopy can be used.

The number of the functional groups is measured, specifically, by the following method. First, the copolymer is formed by cold press to prepare a film of 0.25 to 0.30 mm in thickness. The film is analyzed by Fourier transform infrared spectroscopy to obtain an infrared absorption spectrum of the copolymer, and a difference spectrum against a base spectrum that is completely fluorinated and has no functional groups is obtained. From an absorption peak of a specific functional group observed on this difference spectrum, the number N of the functional group per $1\times10^6$ carbon atoms in the copolymer is calculated according to the following formula (A).

$$N = I \times K / t \quad (A)$$

I: absorbance
K: correction factor
t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency (cm$^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2=CF_2$ |

Absorption frequencies of —CH$_2$CF$_2$H, —CH$_2$COF, —CH$_2$COOH, —CH$_2$COOCH$_3$ and —CH$_2$CONH$_2$ are lower by a few tens of kaysers (cm$^{-1}$) than those of —CF$_2$H, —COF, —COOH free and —COOH bonded, —COOCH$_3$ and —CONH$_2$ shown in the Table, respectively.

For example, the number of the functional group —COF is the total of the number of a functional group determined from an absorption peak having an absorption frequency of 1,883 cm$^{-1}$ derived from —CF$_2$COF and the number of a functional group determined from an absorption peak having an absorption frequency of 1,840 cm$^{-1}$ derived from —CH$_2$COF.

The functional groups are ones present on main chain terminals or side chain terminals of the copolymer, and ones present in the main chain or the side chains. The number of the functional groups may be the total of numbers of —CF=CF$_2$, —CF$_2$H, —COF, —COOH, —COOCH$_3$, —CONH$_2$ and —CH$_2$OH.

The functional groups are introduced to the copolymer by, for example, a chain transfer agent or a polymerization initiator used for production of the copolymer. For example, in the case of using an alcohol as the chain transfer agent, or a peroxide having a structure of —CH$_2$OH as the polymerization initiator, —CH$_2$OH is introduced on the main chain terminals of the copolymer. Alternatively, the functional group is introduced on the side chain terminal of the copolymer by polymerizing a monomer having the functional group.

The copolymer satisfying the above range regarding the number of functional groups can be obtained by subjecting the copolymer to a fluorination treatment. That is, the copolymer contained in the injection molded article of the present disclosure is preferably one which is subjected to the fluorination treatment. Further, the copolymer contained in the injection molded article of the present disclosure preferably has —CF$_3$ terminal groups.

The melting point of the copolymer is preferably 295 to 315° C., more preferably 300° C. or higher, still more preferably 301° C. or higher, and especially preferably 302° C. or higher, and more preferably 310° C. or lower, and still more preferably 305° C. or lower. Due to that the melting point is in the above range, the abrasion resistance at 90° C., the long-time tensile creep property, the chemical solution low permeability, the rigidity on heating and the heat distortion resistance after chemical immersion are further improved, even when the flow length of the injection molded article is high.

In the present disclosure, the melting point can be measured by using a differential scanning calorimeter [DSC].

The methyl ethyl ketone (MEK) permeability of the injection molded article of the present disclosure is preferably 74.0 g/m$^2$ or lower. For example, when being used to allow a chemical solution to flow, the injection molded article of the present disclosure can highly suppress the permeation of a chemical solution such as MEK to the outside.

In the present disclosure, the MEK permeability can be measured under the condition of a temperature of 60° C. and for 60 days. Specific measurement of the MEK permeability can be carried out by a method described in Examples.

In the injection molded article of the present disclosure, the amount of fluorine ions dissolving out therefrom detected by a hydrogen peroxide solution immersion test is, in terms of mass, preferably 5.0 ppm or lower, more preferably 4.0 ppm or lower and still more preferably 3.0 ppm or lower. When the injection molded article of the present disclosure is used as, for example, piping members that are used to transfer a chemical solution, such as joints, and flowmeter members for measuring the flow rate of a chemical solution, the contamination of the chemical solution by fluorine ions can be highly suppressed.

In the present disclosure, the hydrogen peroxide solution immersion test can be carried out by preparing a test piece having a weight corresponding to that of 30 formed articles (40 mm×40 mm×0.5 mmt), immersing the test piece in 50 g of a 3% by weight aqueous hydrogen peroxide solution, heating the test piece at 90° C. for 20 hours, and further heating the test piece at 121° C. for 3 hours.

The injection molded article of the present disclosure may contain other components such as fillers, plasticizers, processing aids, mold release agents, pigments, flame retarders, lubricants, light stabilizers, weathering stabilizers, electrically conductive agents, antistatic agents, ultraviolet absorbents, antioxidants, foaming agents, perfumes, oils, softening agents and dehydrofluorination agents.

Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber. The electrically conductive agents include carbon black. The plasticizers include dioctyl phthalate and pentaerythritol. The processing aids include carnauba wax, sulfone compounds, low molecular weight polyethylene and fluorine-based auxiliary agents. The dehydrofluorination agents include organic oniums and amidines.

As the above-mentioned other components, other polymers other than the copolymer may be used. The other polymers include fluororesins other than the copolymer, fluoroelastomer, and non-fluorinated polymers.

The copolymer contained in the injection molded article of the present disclosure can be produced by a polymerization method such as suspension polymerization, solution polymerization, emulsion polymerization or bulk polymerization. The polymerization method is preferably emulsion polymerization or suspension polymerization. In these polymerization methods, conditions such as temperature and pressure, and a polymerization initiator and other additives can suitably be set depending on the formulation and the amount of the copolymer.

As the polymerization initiator, an oil-soluble radical polymerization initiator, or a water-soluble radical polymerization initiator may be used.

The oil-soluble radical polymerization initiator may be a known oil-soluble peroxide, and examples thereof typically include:

dialkyl peroxycarbonates such as di-n-propyl peroxydicarbonate, diisopropyl peroxydicarbonate, di-sec-butyl peroxydicarbonate and di-2-ethoxyethyl peroxydicarbonate;

peroxyesters such as t-butyl peroxyisobutyrate and t-butyl peroxypivalate;

dialkyl peroxides such as di-t-butyl peroxide; and di[fluoro(or fluorochloro)acyl] peroxides.

The di[fluoro(or fluorochloro)acyl] peroxides include diacyl peroxides represented by [(RfCOO)—]$_2$ wherein Rf is a perfluoroalkyl group, an ω-hydroperfluoroalkyl group or a fluorochloroalkyl group.

Examples of the di[fluoro(or fluorochloro)acyl] peroxides include di(ω-hydro-dodecafluorohexanoyl) peroxide, di(ω-hydro-tetradecafluoroheptanoyl) peroxide, di(ω-hydro-hexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydrodo-decafluoroheptanoyl-ω-hydrohexadecafluorononanoyl peroxide, ω-chloro-hexafluorobutyryl-ω-chloro-decafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a known water-soluble peroxide, and examples thereof include ammonium salts, potassium salts and sodium salts of persulfuric acid, perboric acid, perchloric acid, perphosphoric acid, percarbonic acid and the like, organic peroxides such as disuccinoyl peroxide and diglutaroyl peroxide, and t-butyl permaleate and t-butyl hydroperoxide. A reductant such as a sulfite salt may be combined with a peroxide and used, and the amount thereof to be used may be 0.1 to 20 times with respect to the peroxide.

In the polymerization, a surfactant, a chain transfer agent and a solvent may be used, which are conventionally known.

The surfactant may be a known surfactant, for example, nonionic surfactants, anionic surfactants and cationic surfactants may be used. Among these, fluorine-containing anionic surfactants are preferred, and more preferred are linear or branched fluorine-containing anionic surfactants having 4 to 20 carbon atoms, which may contain an ether bond oxygen (that is, an oxygen atom may be inserted between carbon atoms). The amount of the surfactant to be added (with respect to water in the polymerization) is preferably 50 to 5,000 ppm.

Examples of the chain transfer agent include hydrocarbons such as ethane, isopentane, n-hexane and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2ClCF_2CFHCl$; chlorofluoroalaknes such as $CF_2ClCFClCF_2CF_3$ and $CF_3CFClCFClCF_3$; hydrofluroalkanes such as $CF_3CFHCFHCF_2CF_2CF_3$, $CF_2HCF_2CF_2CF_2CF_2H$ and $CF_3CF_2CF_2CF_2CF_2CF_2H$; hydrofluoroethers such as $CH_3OC_2F_5$, $CH_3OC_3F_5CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$ and $CF_3CHFCF_2OCH_2CF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100% by mass with respect to an aqueous medium.

The polymerization temperature is not limited, and may be 0 to 100° C. The polymerization pressure is suitably set depending on other polymerization conditions to be used such as the kind, the amount and the vapor pressure of the solvent, and the polymerization temperature, but may usually be 0 to 9.8 MPaG.

In the case of obtaining an aqueous dispersion containing the copolymer by the polymerization reaction, the copolymer can be recovered by coagulating, cleaning and drying the copolymer contained in the aqueous dispersion. Then in the case of obtaining the copolymer as a slurry by the polymerization reaction, the copolymer can be recovered by taking out the slurry from a reaction container, and cleaning and drying the slurry. The copolymer can be recovered in a shape of powder by the drying.

The copolymer obtained by the polymerization may be formed into pellets. A method of forming into pellets is not limited, and a conventionally known method can be used. Examples thereof include methods of melt extruding the copolymer by using a single-screw extruder, a twin-screw extruder or a tandem extruder and cutting the resultant into a predetermined length to form the copolymer into pellets. The extrusion temperature in the melt extrusion needs to be varied depending on the melt viscosity and the production method of the copolymer, and is preferably the melting point of the copolymer+20° C. to the melting point of the copolymer+140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, —COOCH$_3$, —CH$_2$OH, —COF, —CF=CF$_2$ and —CONH$_2$, and thermally relatively stable functional groups thereof, such as —CF$_2$H, can be converted to thermally very stable —CF$_3$. Consequently, the total number (number of functional groups) of —COOH, —COOCH$_3$, —CH$_2$OH, —COF, —CF=CF$_2$, —CONH$_2$ and —CF$_2$H of the copolymer can easily be controlled in the above-mentioned range.

The fluorine-containing compound is not limited, but includes fluorine radical sources generating fluorine radicals under the fluorination treatment condition. The fluorine radical sources include F$_2$ gas, CoF$_3$, AgF$_2$, UF$_6$, OF$_2$, N$_2$F$_2$, CF$_3$OF, halogen fluorides (for example, IF$_5$ and ClF$_3$).

The fluorine radical source such as F$_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas and argon gas, but from the viewpoint of the economic efficiency, nitrogen gas is preferred.

The condition of the fluorination treatment is not limited, and the copolymer in a melted state may be brought into contact with the fluorine-containing compound, but the fluorination treatment can be carried out usually at a temperature of not higher than the melting point of the copolymer, preferably at 20 to 240° C. and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas ($F_2$ gas).

The injection molded article of the present disclosure can be produced by the method for injection molding the copolymer obtained as above using an injection molding machine and a mold provided with a gate. According to the production method of the present disclosure, there can be produced an injection molded article which is excellent in the abrasion resistance at 90° C., the long-time tensile creep property, the chemical solution low permeability, the rigidity on heating and the heat distortion resistance after chemical immersion, hardly makes fluorine ions dissolve out in a chemical solution, and has a beautiful appearance and a high flow length. Further, since the production method of the present disclosure comprises forming the above copolymer, an injection molded article having a high flow length and a complicated shape can easily be produced by using the production method of the present disclosure, and for example, injection molded articles such as housings of flowmeters, housings of valves, and filter cages can easily be produced.

The shape of the copolymer to be supplied into an injection molding machine is not limited, and a copolymer in a shape of powder, pellet, or the like can be used.

A known injection molding machine can be used. The copolymer injected from a nozzle of an injection molding machine usually passes through a sprue, a runner, and a gate, flows into a mold cavity, and is filled in the mold cavity. In the mold used for injection molding, a runner and a gate are formed, and a mold cavity for forming an injection molded article is formed.

The shape of the sprue is not limited, and may be a circle, a rectangle, a trapezoid, or the like. The shape of the runner is not limited, and may be a circle, a rectangle, a trapezoid, or the like. The runner type is not limited, and may be a cold runner or a hot runner. The gate type is not limited, and may be a direct gate, a side gate, a submarine gate, or the like. The number of gates to the mold cavity is not limited. Any of the mold having a single-gate structure and the mold having a multi-gate structure may be used. The number of mold cavities of the mold (number of cavities) is preferably 1 to 64.

Regarding the flow length of the copolymer from the gate, a mold having a ratio of the maximum flow length (c) from the gate of the mold to the average value (d) of the cavity thickness of the mold on the maximum flow length, ((c)/(d)), of 80 to 200 is used in the injection molding. The ratio ((c)/(d)) is preferably 85 or more, more preferably 87 or more, still more preferably 90 or more, especially preferably 94 or more, and most preferably 100 or more, and preferably 150 or less, and more preferably 135 or less.

There are tendencies that, as the cavity of the mold to be used in the injection molding has more parts having a small thickness, that is, as the ratio ((c)/(d)) is higher, the flow length of the copolymer is unlikely to be longer, so that it is more difficult to obtain a large injection molded article having a lot of thin-wall parts (that is, an injection molded article having a high ratio ((a)/(b))), and furthermore, the appearance of the injection molded article to be obtained deteriorates and the transparency thereof also deteriorates. On the other hand, in the conventional injection molded article having a high ratio ((a)/(b)), there is room for improvement in the abrasion resistance at 90° C., the long-time tensile creep property, the chemical solution low permeability, the rigidity on heating and the heat distortion resistance after chemical immersion, even if the appearance is excellent. Further, an injection molded article which hardly makes fluorine ions dissolve out in a chemical solution is also desired. The production method of the present disclosure, due to having the above configuration, can produce an injection molded article which has a ratio ((a)/(b)) within the range as described above, and furthermore, is excellent in the abrasion resistance at 90° C., the long-time tensile creep property, the chemical solution low permeability, the rigidity on heating and the heat distortion resistance after chemical immersion, hardly makes fluorine ions dissolve out in a chemical solution, and has a beautiful appearance.

In the production method of the present disclosure, due to that there can be produced an injection molded article which is excellent in the abrasion resistance at 90° C., the long-time tensile creep property, the chemical solution low permeability, the rigidity on heating and the heat distortion resistance after chemical immersion, hardly makes fluorine ions dissolve out in a chemical solution, and has a further beautiful appearance, the temperature of the mold is preferably 150 to 250° C., and more preferably 170° C. or higher, and more preferably 230° C. or lower, and still more preferably 200° C. or lower.

In the production method of the present disclosure, due to that there can be produced an injection molded article which is excellent in the abrasion resistance at 90° C., the long-time tensile creep property, the chemical solution low permeability, the rigidity on heating and the heat distortion resistance after chemical immersion, and has a further beautiful appearance, the temperature of the cylinder provided in an injection molding machine is preferably 350 to 420° C., more preferably 370° C. or higher, and more preferably 400° C. or lower.

The injection molded article of the present disclosure can be used in various applications. The injection molded article of the present disclosure may be, for example, nuts, bolts, joints, films, bottles, gaskets, tubes, hoses, pipes, valves, sheets, seals, packings, tanks, rollers, containers, cocks, connectors, filter housings, filter cages, flowmeters, pumps, wafer carrier, or wafer boxes.

Due to that the injection molded article of the present disclosure is excellent in the abrasion resistance at 90° C., the long-time tensile creep property, the chemical solution low permeability, the rigidity on heating and the heat distortion resistance after chemical immersion, hardly makes fluorine ions dissolve out in a chemical solution, and has a beautiful appearance and a high flow length, the injection molded article can suitably be utilized for nuts, bolts, joints, packings, valves, cocks, connectors, filter housings, filter cages, flowmeters, pumps, and the like. For example, the injection molded article of the present disclosure can suitably be utilized as piping members (in particular, housings of valves and filter cages) to be used in the transfer of chemical solutions, and flowmeter housings provided with flow paths for chemical solutions in flowmeters. The piping members and flowmeter housings of the present disclosure are excellent in the abrasion resistance at 90° C., the long-time tensile creep property, the chemical solution low permeability, the rigidity on heating and the heat distortion resistance after chemical immersion, hardly make fluorine ions dissolve out in a chemical solution, and have a beautiful appearance. Hence, the piping members and flowmeter housings of the present disclosure can be suitably used also in the measurement of the flow rate of a chemical solution at about 80° C., and are hardly damaged even when stresses are repeatedly applied according to the start of the flow, the stop of the flow, and the change of the flow rate of the chemical solution.

Due to that the injection molded article of the present disclosure is excellent in the abrasion resistance at the long-time tensile creep property, the chemical solution low permeability, the rigidity on heating and the heat distortion resistance after chemical immersion, hardly makes fluorine ions dissolve out in a chemical solution, and has a beautiful appearance and a high flow length, it can be suitably utilized as members to be compressed such as gaskets and packings.

Due to that the injection molded article of the present disclosure is excellent in the abrasion resistance at the long-time tensile creep property, the chemical solution low permeability, the rigidity on heating and the heat distortion resistance after chemical immersion, hardly makes fluorine ions dissolve out in a chemical solution, and has a beautiful appearance and a high flow length, it can be suitably utilized as bottles or tubes. The bottles or tubes of the present disclosure are hardly damaged during use.

The injection molded article of the present disclosure of the present disclosure is excellent in the abrasion resistance at 90° C., the long-time tensile creep property, the chemical solution low permeability, the rigidity on heating and the heat distortion resistance after chemical immersion, hardly makes fluorine ions dissolve out in a chemical solution, and has a beautiful appearance and a high flow length. Therefore, the injection molded article of the present disclosure can suitably be utilized for housings of valves and valves. The valves of the present disclosure of the present disclosure are excellent in the abrasion resistance at 90° C., the long-time tensile creep property, the chemical solution low permeability, the rigidity on heating and the heat distortion resistance after chemical immersion, and hardly make fluorine ions dissolve out in a chemical solution. The valves of the present disclosure, due to having a high elastic modulus even at high temperatures, can be suitably used to control fluid, for example, at 80° C. or higher.

Although the embodiments have been described above, it will be understood that various changes in form and details are possible without departing from the gist and scope of the claims.

According to the present disclosure, there is provided an injection molded article obtained by injection molding a copolymer using a mold provided with a gate, wherein the copolymer contains tetrafluoroethylene (TFE) unit and a fluoro(alkyl vinyl ether) (PAVE) unit, the content of the fluoro(alkyl vinyl ether) unit of the copolymer is 3.5 to 4.7% by mass with respect to the whole of the monomer units, the melt flow rate at 372° C. of the copolymer is 22.0 to 35.0 g/10 min, the number of functional groups of the copolymer is 20 or less per $10^6$ main-chain carbon atoms, and the injection molded article has a gate section corresponding to the gate of the mold, and the ratio of a maximum flow length (a) from the gate section of the injection molded article to an average value (b) of a product thickness on the maximum flow length, ((a)/(b)), is 80 to 200.

In the injection molded article of the present disclosure, the fluoro(alkyl vinyl ether) unit of the copolymer is preferably perfluoro(propyl vinyl ether) unit.

In the injection molded article of the present disclosure, the content of the fluoro(alkyl vinyl ether) unit of the copolymer is preferably 3.9 to 4.5% by mass with respect to the whole of the monomer units.

In the injection molded article of the present disclosure, the melt flow rate at 372° C. of the copolymer is preferably 24.2 to 30.0 g/10 min.

In the injection molded article of the present disclosure, the melting point of the copolymer is preferably 295 to 305° C.

It is preferable that the injection molded article of the present disclosure further has a weld section, and the ratio of a maximum depth (D) of the weld section to a maximum thickness (L) of the injection molded article, (D/L), is 0.8 or less.

According to the present disclosure, there is provided a method for producing the above injection molded article, the method comprising: injection molding the copolymer by using an injection molding machine and the mold provided with the gate, wherein the ratio of a maximum flow length (c) from the gate of the mold to an average value (d) of a cavity thickness of the mold on the maximum flow length, ((c)/(d)), is 80 to 200.

In the production method of the present disclosure, the temperature of the mold is preferably 150 to 250° C.

In the production method of the present disclosure, the cylinder temperature of the injection molding machine is preferably 350 to 420° C.

EXAMPLES

Next, embodiments of the present disclosure will be described with reference to examples, but the present disclosure is not intended to be limited by these examples.

The numerical values of the Examples were measured by the following methods.

(Content of a Monomer Unit)

The content of each monomer unit was measured by an NMR analyzer (for example, manufactured by Bruker BioSpin GmbH, AVANCE 300, high-temperature probe).

(Melt Flow Rate (MFR))

The polymer was made to flow out from a nozzle of 2.1 mm in inner diameter and 8 mm in length at 372° C. under a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.

(Melting Point)

The polymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); and the melting point was determined from a melting curve peak observed in the second temperature raising step.

(Number of Functional Groups)

Pellets of the copolymer was formed by cold press into a film of 0.25 to 0.30 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that is completely fluorinated and has no functional groups is obtained. From an absorption peak of a specific functional group observed on this difference spectrum, the number N of the functional group per 1×10⁶ carbon atoms in the sample was calculated according to the following formula (A).

$$N = I \times K / t \quad \text{(A)}$$

I: absorbance
K: correction factor
t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

TABLE 2

| Functional Group | Absorption Frequency (cm⁻¹) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH₃ | 1795 | 680 | 342 | $C_7F_{15}COOCH_3$ |
| —CONH₂ | 3436 | 506 | 460 | $C_7H_{15}CONH_2$ |
| —CH₂OH₂, —OH | 3648 | 104 | 2236 | $C_7H_{15}CH_2OH$ |
| —CF₂H | 3020 | 8.8 | 26485 | $H(CF_2CF_2)_3CH_2OH$ |
| —CF=CF₂ | 1795 | 635 | 366 | $CF_2=CF_2$ |

Synthesis Example 1

51.8 L of pure water was charged in a 174 L-volume autoclave; nitrogen replacement was sufficiently carried out; thereafter, 40.9 kg of perfluorocyclobutane, 2.37 kg of perfluoro(propyl vinyl ether) (PPVE) and 1.47 kg of methanol were charged; and the temperature in the system was held at 35° C. and the stirring speed was held at 200 rpm. Then, tetrafluoroethylene (TFE) was introduced under pressure up to MPa, and thereafter 0.103 kg of a 50% methanol solution of di-n-propyl peroxydicarbonate was charged to initiate polymerization. Since the pressure in the system decreased along with the progress of the polymerization, TFE was continuously supplied to make the pressure constant, and 0.052 kg of PPVE was additionally charged for every 1 kg of TFE supplied. The polymerization was finished at the time when the amount of TFE additionally charged reached 40.9 kg. Unreacted TFE was released to return the pressure in the autoclave to the atmospheric pressure, and thereafter, an obtained reaction product was washed with water and dried to thereby obtain 43.0 kg of a powder.

The obtained powder was melt extruded at 360° C. by a screw extruder (trade name: PCM46, manufactured by Ikegai Corp.) to thereby obtain pellets of a TFE/PPVE copolymer. By using the obtained pellets, the PPVE content was measured by the above-mentioned method.

The obtained pellets were put in a vacuum vibration-type reactor VVD-30 (manufactured by Okawara MFG. Co., Ltd.), and heated to 210° C. After vacuumizing, F₂ gas diluted to 20% by volume with N₂ gas was introduced to the atmospheric pressure. 0.5 hour after the F₂ gas introduction, vacuumizing was once carried out and the F₂ gas was again introduced. Further, 0.5 hour thereafter, vacuumizing was again carried out and F₂ gas was again introduced. Thereafter, while the above operation of the F₂ gas introduction and the vacuumizing was carried out every 1 hour, the reaction was carried out at a temperature of 210° C. for 10 hours. After the reaction was finished, the reactor interior was replaced sufficiently by N2 gas to finish the fluorination reaction. By using the fluorinated pellets, the above physical properties were measured by the methods described above.

Synthesis Example 2

Fluorinated pellets were obtained as in Synthesis Example 1, except for changing the charged amount of PPVE to 1.17 kg, changing the charged amount of methanol to 3.87 kg, and adding kg of PPVE for every 1 kg of TFE supplied, to thereby obtain 42.2 kg of a dry powder.

Synthesis Example 3

Fluorinated pellets were obtained as in Synthesis Example 1, except for changing the charged amount of PPVE to 1.73 kg, changing the charged amount of methanol to 4.70 kg, and adding kg of PPVE for every 1 kg of TFE supplied, to thereby obtain 42.6 kg of a dry powder.

Synthesis Example 4

Fluorinated pellets were obtained as in Synthesis Example 1, except for changing the charged amount of PPVE to 1.92 kg, changing the charged amount of methanol to 4.79 kg, changing the charged amount of the 50% methanol solution of di-n-propyl peroxydicarbonate to 0.051 kg, and adding 0.044 kg of PPVE for every 1 kg of TFE supplied, to thereby obtain 42.7 kg of a dry powder.

Synthesis Example 5

Fluorinated pellets were obtained as in Synthesis Example 1, except for changing the charged amount of PPVE to 2.05 kg, changing the charged amount of methanol to 2.12 kg, adding 0.046 kg of PPVE for every 1 kg of TFE supplied, changing the raised temperature of the vacuum vibration-type reactor to 160° C., and changing the reaction condition to at 160° C. and for 5 hours, to thereby obtain 42.8 kg of a dry powder.

Synthesis Example 6

Fluorinated pellets were obtained as in Synthesis Example 1, except for changing the charged amount of PPVE to 1.73 kg, changing the charged amount of methanol to 2.27 kg, and adding kg of PPVE for every 1 kg of TFE supplied, to thereby obtain 42.6 kg of a dry powder.

Synthesis Example 7

Fluorinated pellets were obtained as in Synthesis Example 1, except for changing the charged amount of PPVE to 1.79 kg, changing the charged amount of methanol to 6.61 kg, changing the charged amount of the 50% methanol solution of di-n-propyl peroxydicarbonate to 0.051 kg, and adding 0.042 kg of PPVE for every 1 kg of TFE supplied, to thereby obtain 41.0 kg of a dry powder.

Synthesis Example 8

Fluorinated pellets were obtained as in Synthesis Example 1, except for changing the charged amount of PPVE to 2.05 kg, changing the charged amount of methanol to 2.12 kg, and adding kg of PPVE for every 1 kg of TFE supplied, to thereby obtain 42.8 kg of a dry powder.

Synthesis Example 9

Fluorinated pellets were obtained as in Synthesis Example 1, except for changing the charged amount of PPVE to 2.11 kg, changing the charged amount of methanol to 2.09 kg, and adding kg of PPVE for every 1 kg of TFE supplied, to thereby obtain 42.8 kg of a dry powder.

By using the pellets obtained in Synthesis Examples, the above physical properties were measured by the methods described above. The results are shown in Table 3.

TABLE 3

| | PPVE content (% by mass) | MFR (g/10 min) | Number of functional groups (number/C10$^5$) | Melting point (° C.) |
|---|---|---|---|---|
| Synthesis Example 1 | 4.9 | 30.4 | <6 | 302 |
| Synthesis Example 2 | 3.0 | 26.6 | <6 | 310 |
| Synthesis Example 3 | 3.9 | 48.3 | <6 | 305 |
| Synthesis Example 4 | 4.2 | 16.2 | <6 | 304 |
| Synthesis Example 5 | 4.4 | 29.0 | 46 | 304 |
| Synthesis Example 6 | 3.9 | 24.2 | <6 | 305 |
| Synthesis Example 7 | 4.0 | 25.0 | <6 | 305 |
| Synthesis Example 8 | 4.4 | 29.0 | <6 | 304 |
| Synthesis Example 9 | 4.8 | 30.0 | <8 | 304 |

The description of "<6" in Table 3 means that the number of functional groups is less than 6.

Comparative Experimental Examples 1 to 5 and Experimental Examples 1 to 4

By using the pellets obtained above, sheet-shape injection molded articles each having different shapes were prepared by the following method. The obtained sheet-shape injection molded articles were evaluated. The results are shown in Table 4.

Sheet-shape injection molded article (40 mm×40 mm×0.5 mmt)

The copolymer was injection molded by using an injection molding machine (SE50EV-A, manufactured by Sumitomo Heavy Industries, Ltd.) set at a cylinder temperature of 400° C., a mold temperature of 200° C. and an injection speed of 20 mm/s. The mold used was a mold (4 cavities of 40 mm×40 mm×0.5 mmt, side gate) made of HPM38.

Sheet-Shape Injection Molded Article (155 mm×100 mm×2 mmt)

The copolymer was injection molded by using an injection molding machine (SE50EV-A, manufactured by Sumitomo Heavy Industries, Ltd.) set at a cylinder temperature of 380° C., a mold temperature of 180° C. and an injection speed of 10 mm/s. The mold used was a mold (155 mm×100 mm×2 mmt, film gate) Cr plated on HPM38.

(Abrasion Test)

From the sheet-shape injection molded article (155 mm×100 mm×2 mmt), a test piece of 10 cm×10 cm was cut out. The prepared test piece was fixed on a test bench of a Taber abrasion tester (No. 101 Taber type abrasion tester with an option, manufactured by YASUDA SEIKI SEISAKUSHO, LTD.) and the abrasion test was carried out at a test piece surface temperature of 90° C. and a load of 500 g, using an abrasion wheel CS-10 (rotationally polished in 20 rotations with an abrasive paper #240) and at a rotation rate of 60 rpm by using the Taber abrasion tester. The weight of the test piece after 1,000 rotations was measured, and the same test piece was further subjected to the test of 5,000 rotations and thereafter, the weight thereof was measured. The abrasion loss was determined by the following formula.

Abrasion loss (mg)=$M1-M2$

M1: the weight of the test piece after the 1,000 rotations (mg)
M2: the weight of the test piece after the 5,000 rotations (mg)

(Load Deflection Rate at 80° C.)

After the sheet-shape injection molded article (155 mm×100 mm×2 mmt) was allowed to stand at 60° C. for 24 hours, a test piece of 80×10 mm was cut out from the injection molded article and heated in an electric furnace at 100° C. for 20 hours. Except for using the obtained test piece, the test was carried out according to a method described in JIS K-K 7191-1 using a heat distortion tester (manufactured by YASUDA SEIKI SEISAKUSHO, LTD.) under the conditions of at a test temperature of 30 to 150° C., a temperature-increasing rate of 120° C./hour, a bending stress of 1.8 MPa and a flatwise method. The load deflection rate was determined by the following formula. A sheet having a low load deflection rate at 80° C. is excellent in the rigidity at high temperatures.

Load deflection rate (%)=$a2/a1\times100$ a1: the test piece thickness before test (mm)
a2: the amount of deflection at 80° C. (mm)

(Hydrogen Peroxide Aqueous Solution Immersion Crack Test)

The sheet-shape injection molded article (155 mm×100 mm×2 mmt) was punched out by using a rectangular dumbbell of 13.5 mm×38 mm to obtain three test pieces. A notch was formed on the middle of a long side of the each obtained test piece according to ASTM D1693 by a blade of 19 mm×0.45 mm. Three notched test pieces and 25 g of 3% by weight aqueous hydrogen peroxide solution were put in a 100-mL polypropylene-made bottle, and heated in an electric furnace at 100° C. for 20 hours; and thereafter, the notched test pieces were taken out. Then, the three notched test pieces obtained were mounted on a stress crack test jig according to ASTM D1693, and heated in an electric furnace at 100° C. for 2 hours; thereafter, the notches and their vicinities were visually observed and the number of cracks was counted. A sheet having no crack generated is excellent in the heat distortion resistance even after immersion in a chemical solution.

Good: the number of cracks was 0
Poor: the number of cracks was 1 or more
(Tensile Creep Test)
The tensile creep strain was measured by using TMA-7100 manufactured by Hitachi High-Tech Science Corporation. From the sheet-shape injection molded article (40 mm×40 mm×0.5 mmt), a sample of 2 mm in width and 22 mm in length was prepared. The sample was mounted on the measurement jig with a 10 mm distance between jigs. A load was applied to the sample such that the load on the cross-section was 3.32 N/mm$^2$, the sample was allowed to stand at 200° C., and the displacement (mm) of the length of the sample from the time point 70 min after the start of the test until the time point 1,320 min after the start of the test was measured to thereby calculate the proportion (tensile creep strain (%)) of the displacement of the length (mm) to the length of the initial sample length (10 mm). A sheet having a small tensile creep strain (%) measured under the condition of 200° C. and 1,320 min hardly elongates even when a tensile load is applied in a high temperature environment for a long time and is excellent in the long-time tensile creep property.
(Hydrogen Peroxide Solution Immersion Test)
sheet-shape injection molded articles (40 mm×40 mm×0.5 mmt) were immersed in 50 g of a 3% by weight aqueous hydrogen peroxide solution, heated in an electric furnace at for 20 hours, further heated in a sterilization machine at 121° C. for 3 hours, and thereafter cooled to room temperature. The sheets were taken out from the aqueous solution, a TISAB solution (10) (manufactured by Kanto Chemical Co., Inc.) was added to the remaining aqueous solution, and the fluorine ion concentration in the obtained aqueous solution was measured by a fluorine ion meter and taken as the fluorine ion concentration (amount of fluorine ions dissolving out).
(Methyl Ethyl Ketone (MEK) Permeability)
The sheet-shape injection molded article (40 mm×40 mm×0.5 mmt) was allowed to stand at 60° C. for 24 hours, and a sheet-shape test piece was prepared from the injection molded article. 10 g of MEK was put in a test cup (permeation area: 12.56 cm$^2$), and the test cup was covered with the sheet-shape test piece; and a PTFE gasket was pinched and fastened to hermetically close the test cup. The sheet-shape test piece was brought into contact with the MEK, and held at a temperature of 60° C. for 60 days, and thereafter, the test cup was taken out and allowed to stand at room temperature for 1 hour; thereafter, the amount of the mass lost was measured. The MEK permeability (g/m$^2$) was determined by the following formula.

MEK permeability (g/m$^2$)=amount of mass lost (g)/permeation area (m$^2$)

TABLE 4

| | Type of copolymer | Abrasion loss at 90° C. (mg) | Load deflection rate at 80° C. (%) | Chemical immersion crack test | Tensile creep strain at 200° C. (%) | Hydrogen peroxide solution immersion test Amount of fluorine ions dissolving out (ppm) | MEK permeability (g/m$^2$) |
|---|---|---|---|---|---|---|---|
| Comparative Experimental Example 1 | Synthesis Example 1 | 39.0 | 70% | Good | 3.16 | 3.1 | 76.4 |
| Comparative Experimental Example 2 | Synthesis Example 2 | 45.1 | 47% | Poor | 1.76 | 2.3 | 70.3 |
| Comparative Experimental Example 3 | Synthesis Example 3 | 52.5 | 58% | Poor | 2.31 | 2.7 | 69.2 |
| Comparative Experimental Example 4 | Synthesis Example 4 | 35.2 | 62% | Good | 2.54 | 2.8 | 77.7 |
| Comparative Experimental Example 5 | Synthesis Example 5 | 40.5 | 64% | Good | 2.70 | 25.3 | 76.3 |
| Experimental Example 1 | Synthesis Example 6 | 40.2 | 58% | Good | 2.31 | 2.7 | 73.3 |
| Experimental Example 2 | Synthesis Example 7 | 40.2 | 59% | Good | 2.39 | 2.7 | 73.5 |
| Experimental Example 3 | Synthesis Example 8 | 40.5 | 64% | Good | 2.70 | 2.9 | 73.6 |
| Experimental Example 4 | Synthesis Example 9 | 40.6 | 65% | Good | 2.79 | 2.9 | 73.8 |

Comparative Experimental Examples 6 to 10 and Experimental Examples 5 to 8

The copolymer described in Table 5 was injection molded by using an injection molding machine (SE50EV-A, manufactured by Sumitomo Heavy Industries, Ltd.) set at a cylinder temperature of 380° C., a mold temperature of 200° C. and an injection speed of 10 mm/s. The mold used was a mold (spiral flow, 10 mm in width, 0.5 mmt, 1 mmt, or 3 mmt in thickness) Cr plated on HPM38. The length (flow length) of the obtained injection molded article was measured, and the ratio of the flow length to the thickness (flow length/thickness) was calculated. The appearance of the obtained injection molded article was visually observed and evaluated according to the following criteria. The results are shown in Table 5.

Good: the surface is smooth and excellent in the transparency, and makes a beautiful impression Fair: poor appearance such as a scratch was observed in the region of 10% or less of the surface, but the remaining region of the surface is smooth and is also excellent in the transparency Poor: poor appearance such as a scratch was observed in the region of more than 10% of the surface Further, the distance from the gate section of the obtained injection molded article to the edge of the injection molded article (the maximum flow length (a)) was measured. Then, the average value of the product thickness on the maximum flow length (b) and the ratio ((a)/(b)) were determined by measuring the minimum diameter of a cross section of the injection molded article orthogonal to a line drawn to measure the maximum flow length of the injection molded article (the product thickness on the maximum flow length) for every 2 mm along the line drawn to measure the maximum flow length, integrating the measured values, and calculating the average of the measured values. The results are shown in Table 5.

Experimental Examples 9 to 10

The copolymer described in Table 6 was injection molded by using an injection molding machine (SE50EV-A, manufactured by Sumitomo Heavy Industries, Ltd.) set at a cylinder temperature of 400° C., a mold temperature of 200° C. and an injection speed of 30 mm/s, to thereby obtain an injection molded article. The mold used was a mold (flat plate, 155 mm×100 mm, 1.5 mmt in thickness, two side gates, the gates were mounted at positions 25 mm and 75 mm from the edge of the 100 mm side) Cr plated on HPM38. In the obtained injection molded article, a weld section was formed on the weld section at the center between the gates. The closer to the gate, the deeper the formed weld section, and the more distant from the gate, the shallower the formed weld section.

Figure 2:
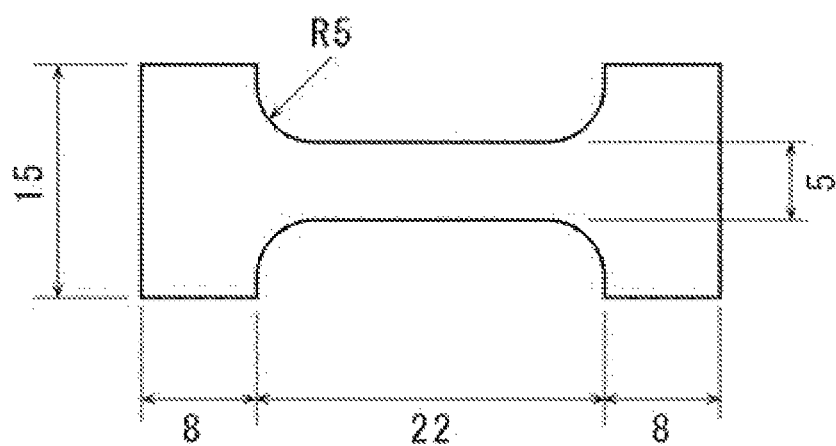
FIG. 2 is a diagram of the shape of a micro dumbbell shape test piece.

As shown in FIG. 1, the weld section 12 in the middle between two positions 11 of the obtained injection molded article 10 which correspond to the gates of the mold is taken as the center, and test pieces were sequentially punched from the injection molded article 10 along the weld section 12 by using a dumbbell cutter 13 to prepare a plurality of micro dumbbell shape test pieces shown in FIG. 2.

The weld depth of the weld section positioned in the middle of the micro dumbbell shape test piece on the gate side (corresponding to "the maximum depth of the weld section (D)") was measured, and the ratio of the maximum depth of the weld section (D) to the maximum thickness of the micro dumbbell shape test piece (L) (in the present experimental example, 1.5 mmt), (weld ratio (D/L), was determined.

In the tensile test, a tensilon universal tester (RTC-1225A manufactured by ORIENTEC CO., LTD.) was used, and the tensile test was carried out at a distance between chucks of 22 mm and a tensile rate of 50 ram/min to measure the maximum point stress (tensile strength).

TABLE 5

| | | Spiral flow | | | | | | | | |
|---|---|---|---|---|---|---|---|---|---|---|
| | | 0.5 mmt | | | 1 mmt | | | 3 mmt | | |
| | Type of copolymer | Flow length (a) (mm) | Ratio a/b | Appearance | Flow length (a) (mm) | Ratio a/b | Appearance | Flow length (a) (mm) | Ratio a/b | Appearance |
| Comparative Experimental Example 6 | Synthesis Example 1 | 51 | 102 | Fair | 117 | 117 | Good | 401 | 134 | Good |
| Comparative Experimental Example 7 | Synthesis Example 2 | 48 | 96 | Fair | 111 | 111 | Good | 380 | 127 | Good |
| Comparative Experimental Example 8 | Synthesis Example 3 | 69 | 138 | Good | 150 | 150 | Good | over measurement limit | — | Good |
| Comparative Experimental Example 9 | Synthesis Example 4 | 39 | 78 | Poor | 92 | 92 | Fair | 366 | 122 | Good |
| Comparative Experimental Example 10 | Synthesis Example 5 | 49 | 98 | Fair | 113 | 113 | Good | 394 | 131 | Good |
| Experimental Example 5 | Synthesis Example 6 | 47 | 94 | Fair | 107 | 107 | Good | 371 | 124 | Good |
| Experimental Example 6 | Synthesis Example 7 | 48 | 96 | Fair | 108 | 108 | Good | 373 | 124 | Good |
| Experimental Example 7 | Synthesis Example 8 | 49 | 98 | Fair | 113 | 113 | Good | 394 | 131 | Good |
| Experimental Example 8 | Synthesis Example 9 | 50 | 100 | Fair | 115 | 115 | Good | 400 | 133 | Good |

The relationship between the weld ratio (D/L) and the tensile strength are shown in Table 6.

TABLE 6

| | Type of copolymer | Tensile strength (MPa) | | | | | | |
|---|---|---|---|---|---|---|---|---|
| | | D/L = 0.20 | D/L = 0.21 | D/L = 0.41 | D/L = 0.42 | D/L = 0.60 | D/L = 0.61 | D/L = 0.86 |
| Experimental Example 9 | Synthesis Example 6 | | 25.3 | | 23.3 | | 21.1(*) | 16.5(*) |
| Experimental Example 10 | Synthesis Example 9 | 25.6 | | 23.9 | | 21.4(*) | | 16.3(*) |

(*)The weld section was broken.

The invention claimed is:

1. An injection molded article obtained by injection molding a copolymer using a mold provided with a gate,
    wherein the copolymer comprises tetrafluoroethylene (TFE) unit and a fluoro(alkyl vinyl ether) (FAVE) unit,
    wherein a content of the fluoro(alkyl vinyl ether) unit of the copolymer is 3.5 to 4.7% by mass with respect to the whole of the monomer units,
    a melt flow rate at 372° C. of the copolymer is 22.0 to 35.0 g/10 min,
    the total number of —CF=$CF_2$, —$CF_2$H, —COF, —COOH, —$COOCH_3$, —$CONH_2$ and —$CH_2$OH of the copolymer is 20 or less per $10^6$ main-chain carbon atoms, and
    the injection molded article has a gate section corresponding to the gate of the mold, and a ratio of a maximum flow length (a) from the gate section of the injection molded article to an average value (b) of a product thickness on the maximum flow length, ((a)/(b)), is 80 to 200.

2. The injection molded article according to claim 1, wherein the fluoro(alkyl vinyl ether) unit of the copolymer is perfluoro(propyl vinyl ether) unit.

3. The injection molded article according to claim 1, wherein the content of the fluoro(alkyl vinyl ether) unit of the copolymer is 3.9 to 4.5% by mass with respect to the whole of the monomer units.

4. The injection molded article according to claim 1, wherein the melt flow rate at 372° C. of the copolymer is 24.2 to 30.0 g/10 min.

5. The injection molded article according to claim 1, wherein a melting point of the copolymer is 295 to 305° C.

6. The injection molded article according to claim 1, wherein the injection molded article further has a weld section, and a ratio of a maximum depth (D) of the weld section to a maximum thickness (L) of the injection molded article, (D/L), is or less.

7. A method for producing the injection molded article according to claim 1, the method comprising:
    injection molding the copolymer by using an injection molding machine and the mold provided with the gate, wherein
    a ratio of a maximum flow length (c) from the gate of the mold to an average value (d) of a cavity thickness of the mold on the maximum flow length, ((c)/(d)), is 80 to 200.

8. The production method according to claim 7, wherein a temperature of the mold is 150 to 250° C.

9. The production method according to claim 7, wherein a cylinder temperature of the injection molding machine is 350 to 420° C.

* * * * *